Werner Langguth
Charles Hummel

Patented Apr. 23, 1929.

1,710,455

UNITED STATES PATENT OFFICE.

WERNER LANGGUTH, OF THUN, AND CHARLES HUMMEL, OF NIEDER-UZWIL, SWITZERLAND.

PROCESS FOR PRODUCING PHOTOGRAPHS IN NATURAL COLORS.

Application filed August 29, 1927, Serial No. 216,334, and in Germany July 9, 1926.

This invention relates to a process of producing photographs in natural colors whereby the disadvantages well-known to exist in the process consisting in the superposition of three component pictures are avoided.

The process comprises the following operations:—

Three negatives, corresponding as nearly as possible with the theoretically correct fundamental colors (orange, yellow-green and violet), are first prepared in the known manner by exposure behind corresponding light filters to the object to be photographed.

A suitable support, for instance a sheet of pure unsized and chromated paper, is saturated with suitable azo-dyestuff components and is exposed in still moist condition under the negative which was taken behind the red light filter. Since this exposure, which is preferably in direct sunlight, raises the temperature of the sensitive paper, which rise of temperature is disadvantageous to the development of the color, the paper is best exposed in a printing frame which is cooled by water. This water-cooling can also be connected with the light filter, to be mentioned later, by forming the latter as a liquid filter.

By the action of the light, which action should be controlled by a suitable light filter, there is produced on the paper a blue-green picture. This is then washed in water, in which the unexposed azo-dyestuff components are dissolved, so that the picture is permanent. The paper is then saturated with other azo-dyestuff components and exposed again under the negative corresponding with the violet light filter, care being taken to ensure careful registration of the first picture with the second. In this manner there is produced upon the blue-green picture a yellow picture. In similar manner the third, purple, component picture is produced.

Figure 1:
Figure 2:
Figure 3:
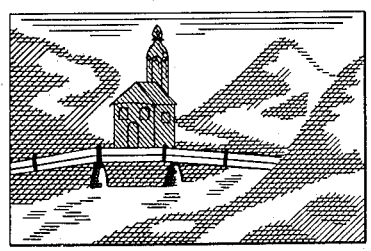

In the accompanying drawing Fig. 1 shows, e. g., a green-blue picture corresponding to the negative which was taken behind the red light filter. Fig. 2 represents the state of the copy after the yellow picture (which corresponds to the negative taken behind the violet light filter) has been copied onto the green-blue picture, and Fig. 3 is the combined color picture consisting of the picture as represented in Fig. 2 and of the purple picture.

For the purpose of protecting the negatives against moisture and discoloration they are covered with a coating of collodion or like protecting layer. The mixture of the three pictures printed in succession on the same support in the theoretically correct fundamental colors gives the finished picture in natural colors. The colors in the still moist print are bright but after drying they become dull and of poor appearance. This disadvantage is removed by coating the finished picture with a solution of a transparent colorless solid body, for instance a cold solution of a fatty oil or of a resin or of a balsam or of collodion, or a hot solution of agar-agar or gelatine; when such a solution dries the paper fibre and the dyestuff are united to a homogeneous whole. Owing to this aftertreatment the light falling upon the picture can penetrate further into the paper surface and is therefore reflected in stronger color; at the same time the picture becomes more fast to light.

By right choice of azo-dyestuff components (direct-dyeing dyestuffs, substantive azo-dyestuffs) dyes are obtained which dye uniformly the paper fibre of the support. The dyes penetrate each separate fibre and by this direct mixing of the fundamental colors, mixed colors are produced which could not be obtained so completely merely by the superposition of differently colored layers.

The control of the covering power of the different color pictures is very simple; since the pictures are produced on the same support and may be observed directly in the printing frame.

The order of succession in which the separate pictures are printed, namely first the green-blue, then the green-yellow and then the purple, is to be followed exactly since otherwise filtrating of the light by the first printed colors may occur which will affect the conditions of the azo-dyestuffs and the brightness and naturalness of the mixed colors.

The light filters used in the exposure are advantageously of color complementary to that of the component picture to be obtained. As azo-dyestuff components which afford three substantive azo-dyestuffs the following have been found especially suitable.—For the green blue picture: salts of dianisoltetrazodisulphonic acid and 1.8- aminonaphthol-2.4-disulphonic acid; for the green-yellow picture: salts of methylbenzidinetetrazodisulphonic acid and aceto-acetic acid $CH_3COCH_2COOH$, or an ester or anilide derived therefrom; for the purple picture: salts of anisidinediazosulphonic acid and oxynaphthoic acid or derivatives thereof, such as esters.

What we claim is:

1. In a process for producing photographs in natural colors of the kind in which three component pictures in the fundamental colors are successively printed on the same support, azo-dyestuff components being used as substances sensitive to light, the improvement which consists in exposing a support, saturated with azo-dyestuff components, while still moist under the negatives in a printing frame having a cooling device, the printing of the composite picture being in the order of succession: first the green-blue, then the green-yellow and finally the purple picture, the exposure of the several composite pictures being under a light filter of color complementary to that of the component picture to be printed, that is to say the green-blue component under a yellow light filter, the green-yellow under a violet and the purple under a blue.

2. In the process referred to in claim 1 the employment only of substantive colors.

3. In the process referred to in claim 1 the employment of the following components: for the blue picture salts of dianisoltetrazodisulphonic acid and 1.8-aminonaphthol-2.4-disulphonic acid—for the yellow picture salts of methylbenzidinetetrazodisulphonic acid and aceto-acetic acid—for the red picture salts of anisidinediazosulphonic acid and oxynaphthoic acid.

4. In the process referred to in claim 1 the employment of the following components: for the blue picture salts of dianisoltetrazodisulphonic acid and 1.8-aminonaphthol-2.4-disulphonic acid—for the yellow picture salts of the derivatives of methylbenzidinetetrazodisulphonic acid and derivatives of the aceto-acetic acid—for the red picture salts of the derivatives of the anisidinediazosulphonic acid and derivatives of the oxynaphthoic acid.

5. In the process referred to in claim 1 the step of treating the finished three-color picture with a solution of a transparent colorless solid substance.

In testimony whereof, we affix our signatures.

WERNER LANGGUTH.
CHARLES HUMMEL.